(12) United States Patent
Lee et al.

(10) Patent No.: US 6,542,215 B2
(45) Date of Patent: Apr. 1, 2003

(54) METHOD OF FORMING A SEAL PATTERN FOR LIQUID CRYSTAL DISPLAY DEVICE

(75) Inventors: Sang-Seok Lee, Taegu (KR); Lim-Su Lee, Taegu (KR)

(73) Assignee: LG. Philips LCD, Co., Ltd. (KR)

( * ) Notice: Subject to any disclaimer, the term of this patent is extended or adjusted under 35 U.S.C. 154(b) by 0 days.

(21) Appl. No.: 09/750,247

(22) Filed: Dec. 29, 2000

(65) Prior Publication Data

US 2001/0022645 A1 Sep. 20, 2001

(30) Foreign Application Priority Data

Dec. 29, 1999 (KR) ............................................. 99-65040

(51) Int. Cl.⁷ ............................................. G02F 1/1339
(52) U.S. Cl. ........................................ 349/153; 349/190
(58) Field of Search ................................. 349/153, 190

(56) References Cited

U.S. PATENT DOCUMENTS 5,410,423 A * 4/1995 Furushima et al. ......... 349/190
6,137,559 A * 10/2000 Tanaka et al. ............... 349/153
6,239,855 B1 * 5/2001 Nakahara et al. ........... 349/153

FOREIGN PATENT DOCUMENTS

| JP | 63-313125 | * 12/1988 | ................. 349/153 |
| JP | 5-188387 | * 7/1993 | ................. 349/153 |

* cited by examiner

*Primary Examiner*—Toan Ton
(74) *Attorney, Agent, or Firm*—McKenna Long & Aldridge LLP

(57) ABSTRACT

A seal pattern including a plurality of main seal lines, a first auxiliary seal line including a plurality of open holes and surrounding the plurality of main seal lines, and a plurality of second auxiliary seal lines positioned corresponding to the open holes. Since the second auxiliary seal lines pass only gas such as air, the main seal lines are protected from being damaged from cleaning detergent or an etching solution during a cleaning and etching process. A hardening agent is used to seal the open holes during an etching process.

19 Claims, 7 Drawing Sheets

METHOD OF FORMING A SEAL PATTERN FOR LIQUID CRYSTAL DISPLAY DEVICE

This application claims the benefit of Korean Patent Application No. 1999-65040, filed on Dec. 29, 1999, which is hereby incorporated by reference.

BACKGROUND OF THE INVENTION

1. Field of the Invention

The present invention relates to a liquid crystal display (LCD) device, and more particularly, to a seal pattern for a liquid crystal display device and method of manufacturing the same.

2. Discussion of the Related Art

Recently, liquid crystal display (LCD) devices with light, thin, low power consumption characteristics have been used, for example, in office automation (OA) equipments and video units. A typical liquid crystal display (LCD) panel has upper and lower substrates and an interposed liquid crystal layer. The upper substrate usually includes common electrodes, while the lower substrate includes switching elements, such as thin film transistors (TFTs), and pixel electrodes.

As the present invention relates to manufacturing liquid crystal display panels, a brief explanation of conventional liquid crystal display manufacturing processes will be discussed. Common electrodes and pixel electrodes are formed on upper and lower substrates, respectively. A seal is then formed on the lower substrate. The upper and lower substrates are then bonded together using the seal such that the common electrodes of the upper substrate and the pixel electrodes of the lower substrate face each other, forming liquid crystal cells. Liquid crystal material is then injected into those cells through injection holes. The injection holes are then sealed. Finally, polarizing films are attached to the outer surfaces of the upper and lower substrates.

The pixel and common electrodes generate electric fields that control the light passing through the liquid crystal cells. By controlling the electric fields desired characters or images are displayed.

While fabricating the various components of a liquid crystal display, such as the thin film transistors or the color filters, typically requires numerous manufacturing steps, the overall fabrication process is relatively straightforward. FIG. 1 illustrates a typical liquid crystal panel manufacturing process in some detail. Step st1 forms an array matrix of thin film transistors and pixel electrodes over an array (lower) substrate.

Step st2 forms an orientation film over the lower substrate. This involves uniformly depositing a polymer thin film over the lower substrate and then uniformly rubbing the polymer thin film with a fabric. The rubbing process involves rubbing the surface of the polymer thin film to orient or align the film. A typical orientation film is an organic thin film such as a polyimide thin film.

Step st3 produces a seal pattern on the lower substrate. When the upper and lower substrates are attached, the seal pattern forms cell spaces that will receive the liquid crystal material. The seal pattern will also prevent the interposed liquid crystal material from leaking out of the completed liquid crystal cell. A thermosetting plastic and a screen-print technology are conventionally used to fabricate the seal pattern.

Step st4 is to spray spacers over the lower substrate. The spacers have a definite size and act to maintain a precise and uniform space between the upper and lower substrates. accordingly, the spacers are placed with a uniform density on the lower substrate using either a wet spray method, in which case the spacers are mixed in an alcohol and then sprayed, or a dry spray method in which only the spacers are sprayed. The dry spray method is divided into a static electric spray method that uses static electricity and a non-electric spray method that uses gas pressure. Since static electricity can be harmful to the liquid crystal, the non-electric spray method is widely used.

The next step, st5, is to align and attach the upper and lower substrates together, and to attach color filters to the upper substrate and the lower substrate. The aligning margin, which is less than a few micrometers, is important. If the upper and lower substrates are aligned and attached beyond the aligning margin, light leaks away such that the liquid crystal cell cannot adequately performed its function.

Step st6 cuts the liquid crystal element fabricated through the above five steps into individual liquid crystal cells. Conventionally, a liquid crystal material was injected into the space between the upper and the lower substrates before cutting the liquid crystal element into individual liquid crystal cells. However, as displays have become larger, the liquid crystal cells are usually cut first and then the liquid crystal material is injected. The cutting process typically includes scribing using a diamond pen to form cutting lines on a substrate, and a breaking step that separates the substrate along the scribed lines.

Step st7 actually injects liquid crystal material into the individual liquid crystal cells. Since each individual liquid crystal cell is a few square centimeters in area, but has only a few micrometer gap between plates, a vacuum injection method is effectively and widely used. Generally, the step of injecting the liquid crystal material into the cells takes the longest manufacturing time. Thus, for manufacturing efficiency, it is important to have optimum conditions for vacuum injection.

Now, referring to FIG. 2, the screen-print method used for the seal pattern process of the third step (st3) is explained.

The screen-print technology is facilitated with a patterned screen 6 and a squeegee 8. In order to interpose the liquid crystal without leakage, the seal pattern 2 is formed along edges of a substrate 1. At one side of the edge, an injection hole 4 for injecting the liquid crystal is formed. To form the seal pattern 2, a thermosetting resin or an ultraviolet-setting epoxy resin and the like is deposited on the substrate 1, and thereafter a solvent included in the sealant is evaporated for leveling.

At this point, although the epoxy resin itself is not harmful to the liquid crystal, an amine in a thermohardening solvent for forming the thermosetting resin decomposes the liquid crystal. Thus, when using the epoxy resin for the seal pattern 2, the sealant formed through the screen-print technology should be pre-baked sufficiently with a gradual variance of the baking temperature. Further, in forming the seal pattern, the uniformity in thickness and width of the sealant are very important to maintain the uniform spacing (or gap) between the two substrates.

FIG. 3 shows a different seal-patterning technology, a dispenser-print technology. As shown, the dispenser-print technology uses a dispenser 20 filled with the sealant and a table 100 where the substrate 1 is placed. The dispenser 20 moves over the table 100 and forms the sealant according to the direction of the arrow so as to form the sealant pattern 2.

FIG. 4 shows a conventional seal pattern formed on a substrate via the above-mentioned seal-patterning technology. Referring to FIG. 4, a seal pattern 2 is formed on a substrate 1. The seal pattern 2 includes main seal lines 2a and an auxiliary seal line 2b. As previously explained, the main seal lines 2a prevent the leakage of the liquid crystal, while the auxiliary seal line 2b surrounds the main seal lines 2a to protect the main seal lines 2a from a cleaning detergent or an etching solution during a cleaning and etching process.

The cleaning and etching process decreases the thickness of the assembled substrates. A 10% decrease in the substrate thickness result in a 20% decrease in the weight of the liquid crystal display device. FIG. 5 illustrates the cleaning and etching process in a block diagram.

Before the seventh step, st7, of injecting the liquid crystal shown in FIG. 1, the assembled substrates produced from the first to sixth steps, st 1 to st 6, shown in FIG. 1, are cleaned manually using a cleaning detergent such as isopropyl alcohol (IPA) or deionized water (DI water). Through the first cleaning step, ST 100, contaminants such as a polymer layer or minute particles on the outer surfaces of the assembled substrates are removed.

Next, in an etching step, ST 200, using an etching apparatus, the assembled substrates are etched in aqueous solution of hydrofluoric (HF) acid.

In a next cleaning step, ST 300, the HF solution remaining on the assembled substrates is removed, and in a drying step, ST 400, the assembled substrates are dried sufficiently.

Subsequently, in the seventh step, st7, of FIG. 1, the liquid crystal is injected into the assembled substrates and sealed. The etching apparatus may also be used for cleaning step ST300 and the drying step ST 400.

As above-mentioned, during the cleaning and etching steps, ST100 and ST200, the auxiliary seal line 2b protects the main seal lines 2a from the cleaning detergent or the HF solution such that the main seal lines 2a maintain their structure. However, the auxiliary seal line 2b is damaged as illustrated in FIG. 6.

Referring to FIG. 6, when an upper substrate 20 is attached to the lower substrate 1, air 10 existing between the main seal lines 2a and auxiliary seal line 2b is pressurized and still remains therebetween. After the attachment, since there is no open hole in the auxiliary seal line 2b, the pressurized air 10 in the assembled substrate makes air bubbles 16 or cracks 18 in the main and auxiliary seal lines 2a and 2b. Due to the air bubbles 16 and cracks 18, the main seal lines 2a cannot stably seal the liquid crystal injected in a later process.

SUMMARY OF THE INVENTION

Accordingly, the present invention is directed to a seal pattern for a liquid crystal display device that substantially obviates one or more of the problems due to limitations and disadvantages of the related art.

An advantage of the present invention is a seal pattern that prevents damage from a cleaning detergent or an etchant.

Another advantage of the present invention is a seal pattern that allows a free flow of air.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of fabricating a liquid crystal display device includes preparing first and second substrates; forming a main seal line on the first substrate; forming an auxiliary seal lines on the first substrate, the auxiliary seal line having a plurality of open holes; attaching the first and second substrates; etching the first and second substrates by an etching solution; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to preferred embodiments of the present invention, which are illustrated in the accompanying drawings.

Figure 1:
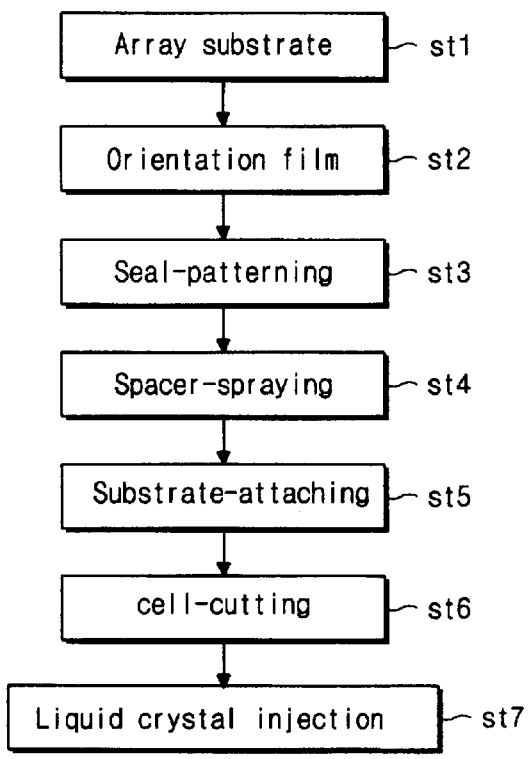
FIG. 1 is a block diagram illustrating a typical manufacturing process for a liquid crystal cell.
Figure 2:
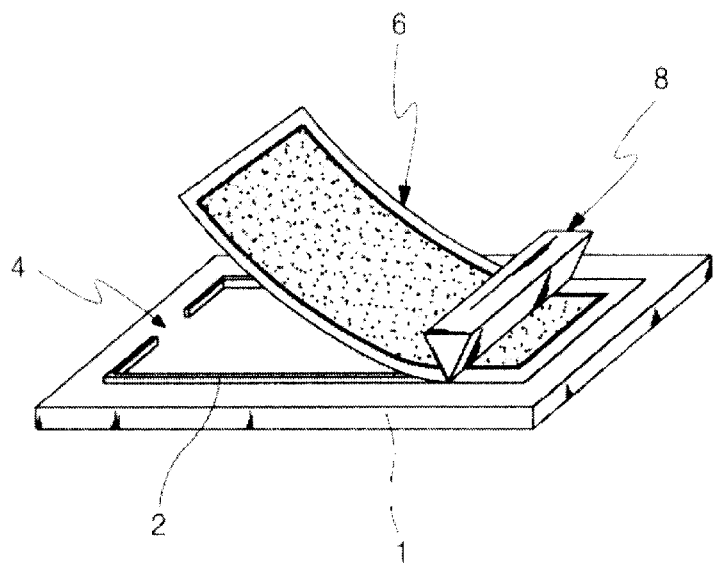
FIG. 2 is a perspective view illustrating a seal pattern process with a screen-print method.
Figure 7:
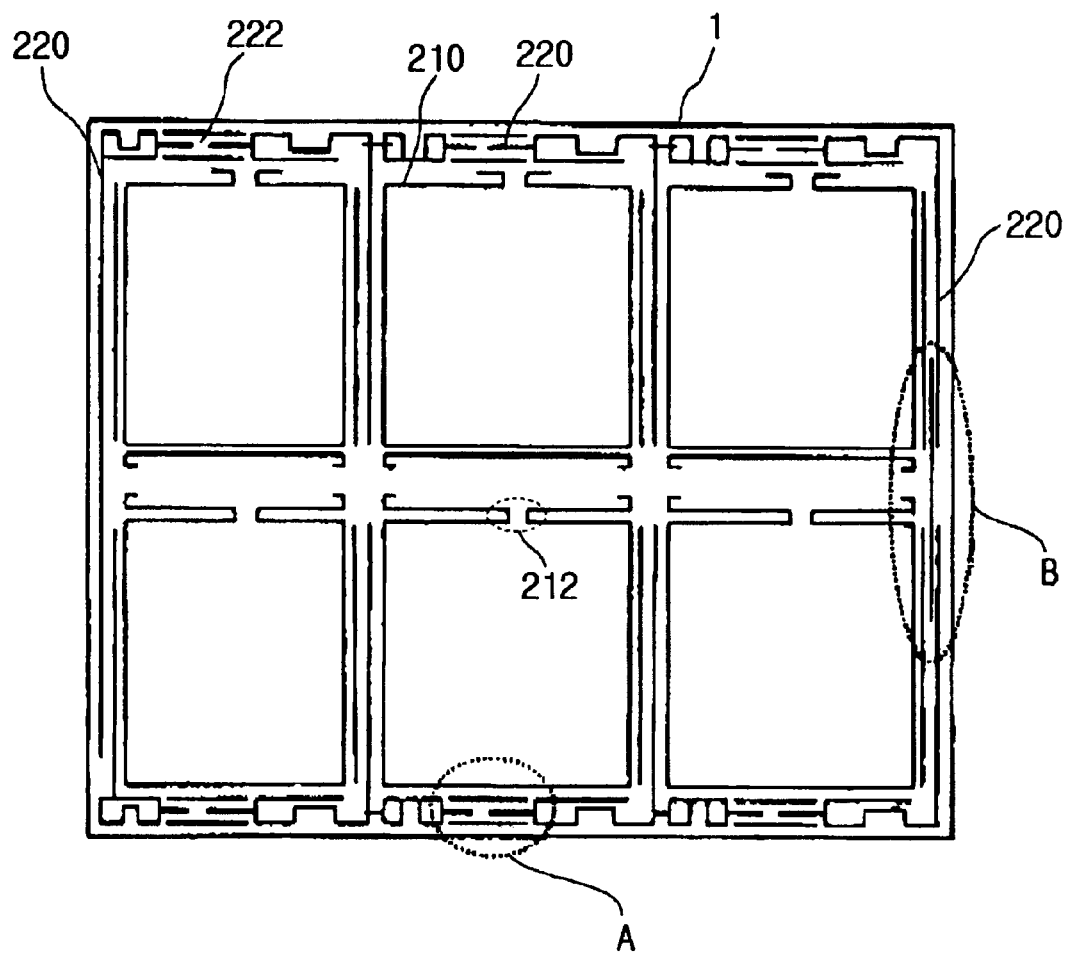
FIG. 7 is a plane view of a seal pattern according to a preferred embodiment of the present invention.

Referring to FIG. 7, on a substrate 1, a plurality of main seal lines 210 are formed in a rectangular shape. At one side of each of the main seal line 210, an injection hole 212 is formed to open the rectangular main seal line 210. Through the injection hole 212, a liquid crystal will be injected in the liquid crystal injection step, st 7, shown in FIG. 1, into a space defined by the main seal lines 210.

A first auxiliary seal line 220 is formed on the substrate 1 and surrounds the plurality of main seal lines 210 with gaps between the main and the auxiliary seal lines 210 and 220. In the first auxiliary seal line 220, a plurality of open holes 222 are formed to open the first auxiliary seal line 220. The open holes 222 should preferably not overlap the injection holes 212 of the main seal lines 210 in its location.

Figure 3:
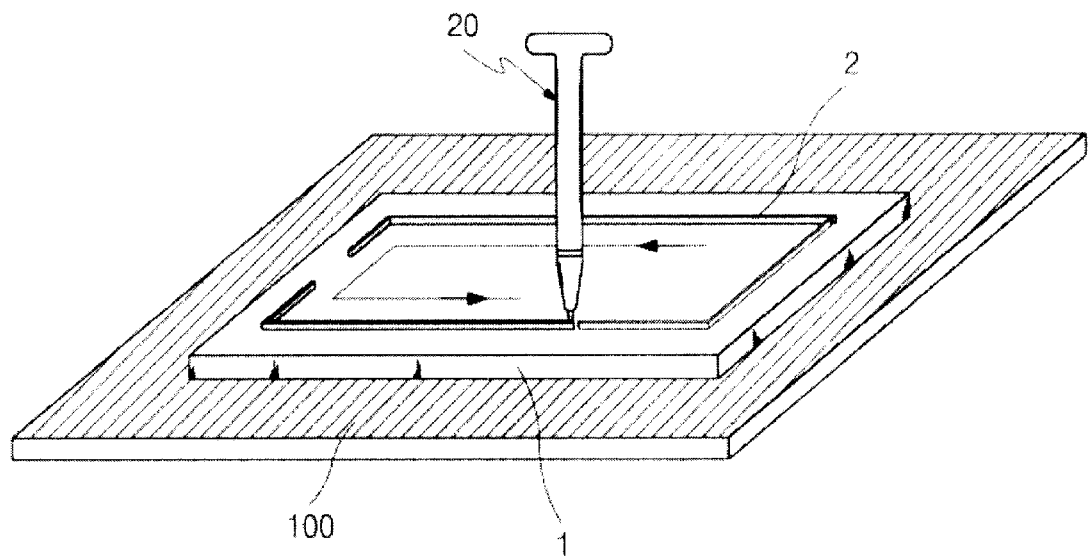
FIG. 3 is a perspective view illustrating a dispenser-print method for the seal pattern.
Figure 4:
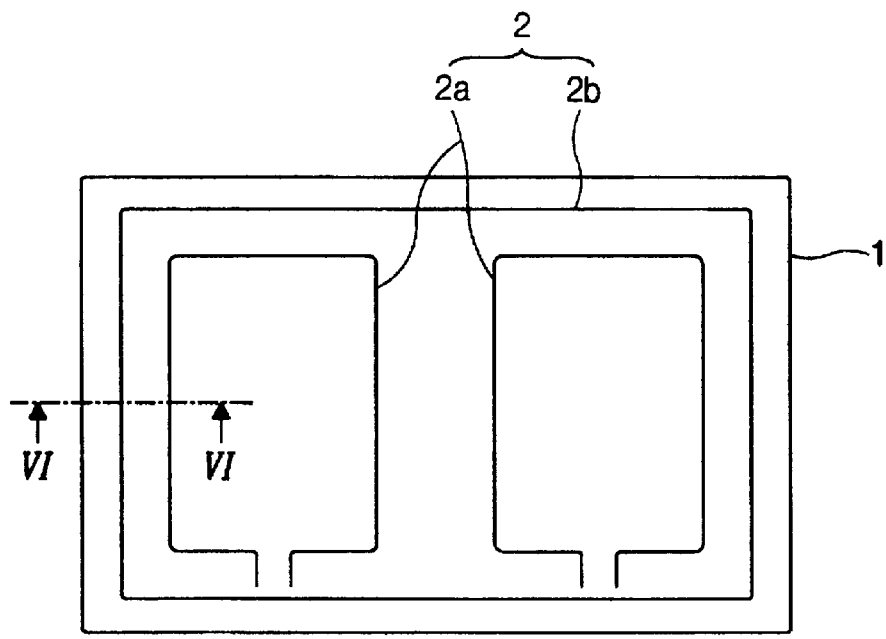
FIG. 4 is a plane view of a conventional seal pattern printed on a substrate.
Figure 5:
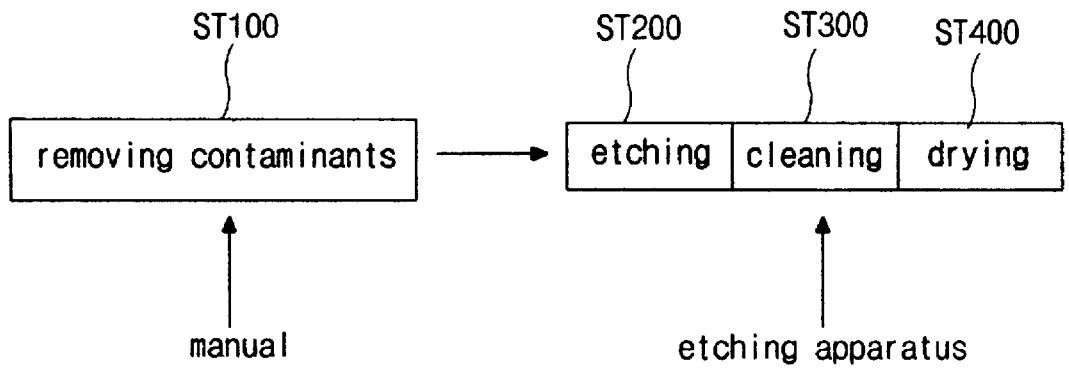
FIG. 5 is a block diagram illustrating a typical etching process for a liquid crystal panel.
Figure 6:
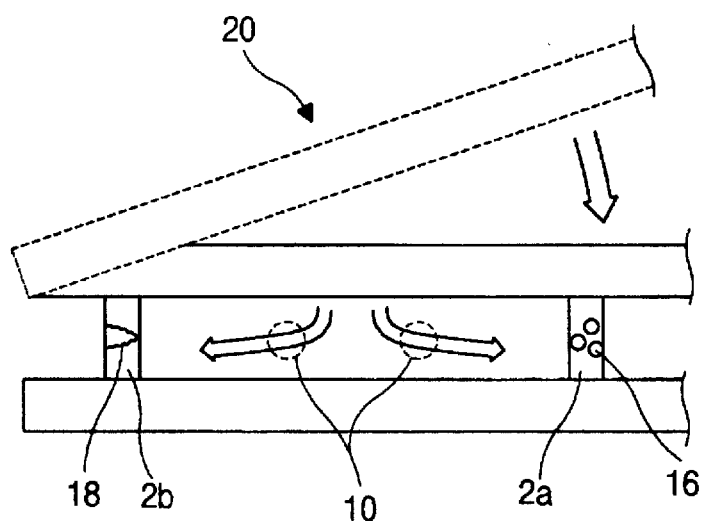
FIG. 6 is a cross-sectional view of the liquid crystal display device panel taken along a line "VI—VI" shown in FIG. 4.
Figure 9A:
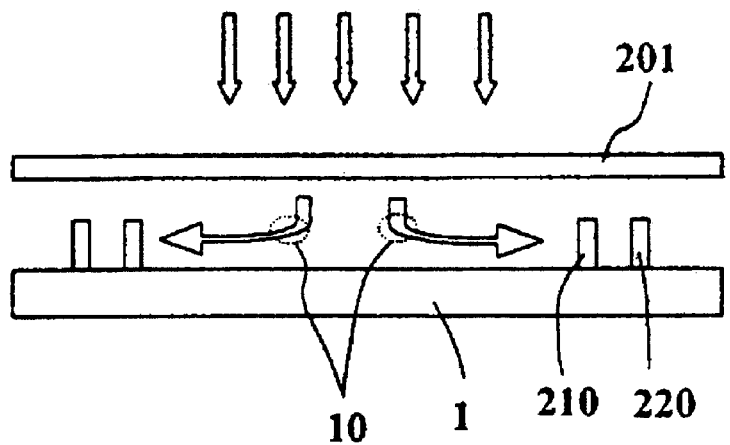
FIGS. 9A to 9C illustrate attaching and etching processes according to another preferred embodiment of the present invention.

Through the open holes 222, air is taken out during a substrate-attaching process shown in FIG. 9A. The first auxiliary seal line 220 is preferably formed using a dispenser-print technology shown in FIG. 3.

Figure 8A:
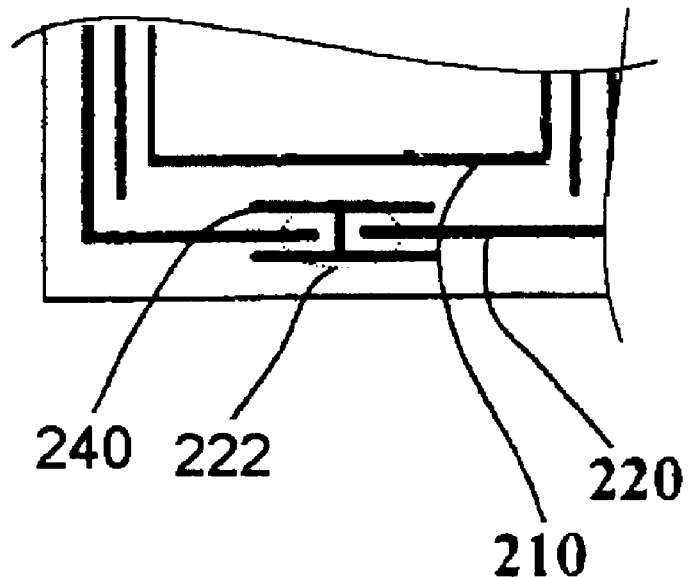
FIG. 8A is an enlarged plane view of a portion "A" of FIG. 7.
Figure 8B:
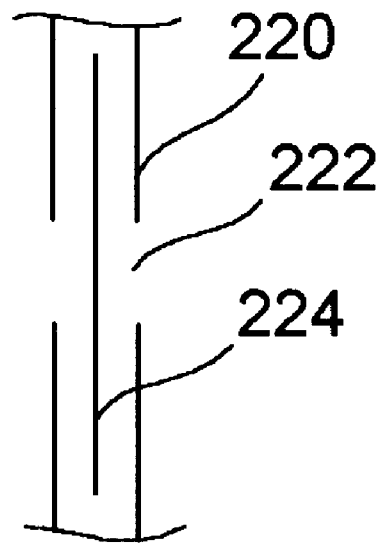
FIG. 8B is an enlarged plane view of a portion "B" of FIG. 7.

FIGS. 8A and 8B respectively show an enlarged view of portions "A" and "B" of FIG. 7. Referring to FIGS. 8A and 8B, second and third auxiliary seal lines 240 and 224 are respectively formed to cover the open holes 222.

Since the open hole 222 is covered with the second auxiliary seal line 240 or the third auxiliary seal line 224, pressurized air produced during the substrate-attaching process is forced out through gaps between the open hole 222 and the third auxiliary seal line 224. On the contrary, an etching solution during an etching process is blocked by the second and third auxiliary seal lines 240 and 224 due to a surface tension of the etching solution. Therefore, the main seal lines 210 are protected from the etching solution. The second and third seal lines 240 and 224 are preferably and easily formed using the dispenser-print technology with a preset program to control the dispenser shown in FIG. 3.

Figure 9B:
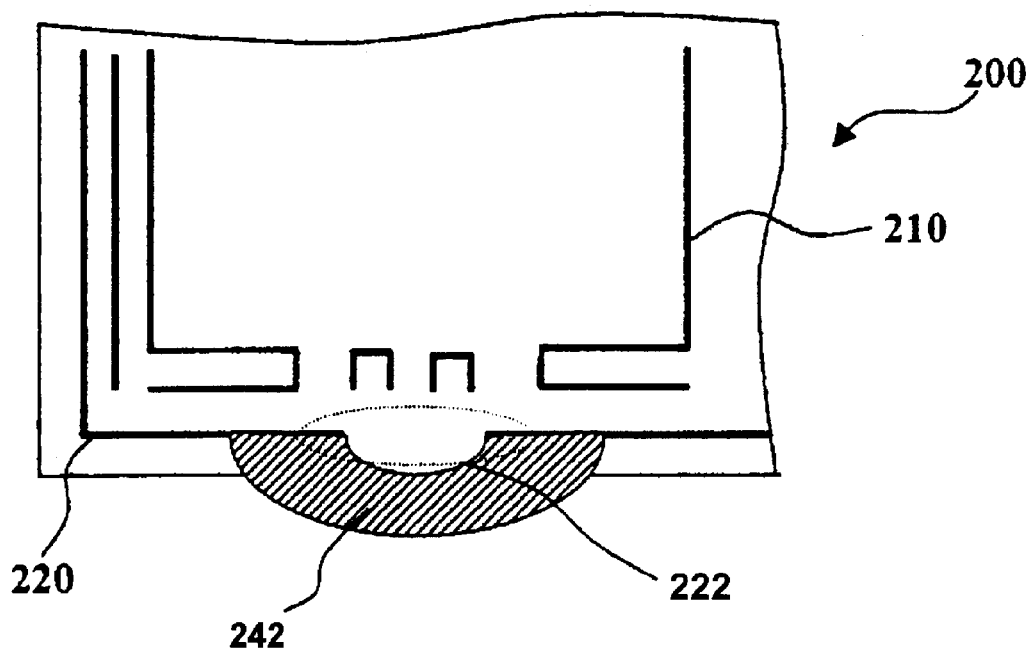
Figure 9C:
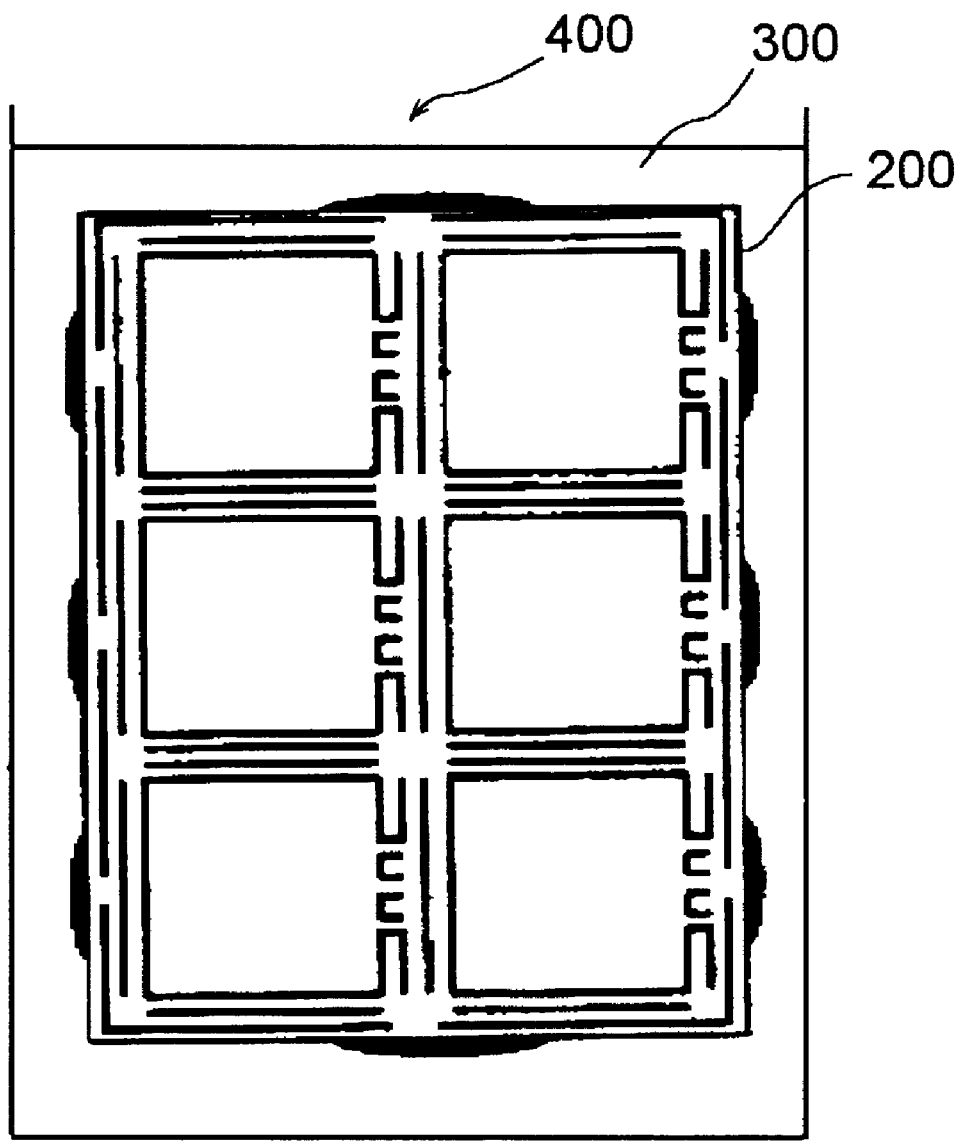

FIGS. 9A to 9C illustrate a process of attaching and etching the substrates that adopts a seal pattern according to another preferred embodiment of the present invention. Here, the second and third auxiliary seal lines illustrated in FIGS. 8A and 8B are not shown for simplicity sake and to focus on the processes.

As shown in FIG. 9A, when the lower substrate 1, or the substrate 1 of FIG. 8, is attached to an upper substrate 201, pressurized air 10 is forced out through the open holes shown in FIG. 8. Although not shown in FIG. 9A, the plurality of open holes are formed in the first auxiliary line 220.

Thereafter, as shown in FIG. 9B, the open hole 222 of the attached substrates 200 including the lower and upper substrate 1 and 201 is sealed using a hardening agent 242. Namely, the hardening agent 242 is used to seal the open hole 222 that is formed in the first auxiliary seal line 220 such that the etching solution is prevented from penetrating into the open hole 222 during the etching process, which is illustrated in FIG. 9C. A thermosetting resin and an ultraviolet-setting resin are preferably used for the hardening agent 242.

Finally, as shown in FIG. 9C, the attached substrates 200 are etched away after contaminants on the attached substrates 200 are removed. In particular, the attached substrates 200 sealed by the hardening agent 242 are dipped into an etching bath 400 to be etched by an etching solution, such as an HF solution 300. Since the substrates include silicon oxide ($SiO_2$) by 60%, a chemical reaction occurs between the substrates and the HF solution as follows:

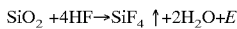

$$SiO_2 + 4HF \rightarrow SiF_4 \uparrow + 2H_2O + E$$

During the etching step, st 200, silicon oxide of the substrates is etched away via the HF solution. Here, "E" is the heat of the reaction that is produced during the etching step.

By measuring the heat of the reaction "E" (a reaction temperature), the etching rate is calculated. The etching step is facilitated by considering the reaction temperature. When the reaction temperature becomes equal to a reference temperature, etching is stopped and the device reduction in thickness of the substrates is achieved. After the above-mentioned etching process, edges of the attached substrates where the hardening agents 242 are formed are cut away, and a liquid crystal injection process proceeds.

The etching process decreases the thickness of the assembled substrates via etching. A 10% decrease in the substrate thickness results in a 20% decrease in the weight of a liquid crystal panel, or the lower and upper substrates.

In short, to decrease the weight of the attached substrates, the attached substrates were conventionally processed with an etching solution or a cleaning detergent for a long duration such that the main seal lines were decomposed or deformed due to the etching solution or the cleaning detergent. To overcome this problem, a conventional auxiliary seal line was formed to surround and protect the main seal lines. However, due to the auxiliary seal line, another problem arose during the substrate-attaching process in that, air within the main seal lines became pressurized which deformed the main and auxiliary seal lines.

To overcome the problem associated with the conventional seal lines, another preferred embodiment of the present invention provides an auxiliary seal line that surrounds the main seal lines and includes a plurality of open holes. By forming the open holes of the auxiliary seal line, the deformation of the seal lines due to pressurized air is prevented. In addition, by sealing the open holes with a hardening agent, the etching solution or cleaning detergent used in the etching process cannot penetrate into the main seal lines.

In another preferred embodiment of the present invention, the pressurized air is forced out through the open holes formed in the auxiliary seal line, while the etching solution is blocked due to the hardening agent. Therefore, problems occurring in conventional substrates are effectively decreased, if not completely removed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device having first and second substrates comprising:

forming a main seal line on the first substrate, an injection hole being formed at least on one side of the main seal line;

forming an auxiliary seal line on the first substrate, the auxiliary seal line having a plurality of open holes and surrounding the main seal line, wherein the plurality of open holes do not overlap the injection hole;

attaching the first and second substrates;

etching the first and second substrates by an etching solution; and forming a liquid crystal layer between the first and second substrates.

2. The method of claim 1, wherein forming the liquid crystal layer is performed prior to etching the first and second substrates.

3. The method of claim 1, wherein the etching solution includes hydrofluoric (HF) acid.

4. The method of claim 1, further comprising sealing the plurality of open holes after attaching the first and second substrates.

5. The method of claim 4, wherein sealing the plurality of open holes uses a hardening resin.

6. The method of claim 5, wherein the hardening resin includes an ultraviolet-setting resin.

7. The method of claim 5, wherein the hardening resin acts to prevent the etching solution from penetrating into the main seal lines.

8. The method of claim 1, further comprising cutting edges of the first and second substrates after etching.

9. The method of claim 1, wherein the auxiliary seal line includes first and second auxiliary seal lines.

10. The method of claim 9, wherein the second auxiliary seal line covers the open holes.

11. The method of claim 9, wherein the second auxiliary seal line includes a shape of a letter "I".

12. The method of claim 1, wherein the main seal line is formed using a dispenser-print method.

13. The method of claim 1, wherein a plurality of auxiliary seal lines are formed using a dispenser-print method.

14. The method of claim 1, wherein etching the first and second substrates includes decreasing a thickness of the first and second substrates using an etching apparatus.

15. The method of claim 14, wherein the thickness is controlled by a reaction temperature of a reaction between the substrates and the etching solution.

16. A liquid crystal display device comprising:

first and second substrates;

a plurality of main seal lines on the first substrate, an injection hole being formed at least on one side of each of the plurality of main seal lines;

a first auxiliary seal line on the first substrate, the first auxiliary seal line having a plurality of open holes, wherein the plurality of open holes do not overlap the injection hole;

a plurality of second auxiliary seal lines on the first substrate, the second auxiliary seal lines covering the open holes; and a liquid crystal layer between the first substrate and the second substrate.

17. The liquid crystal display device of claim 16, wherein the second auxiliary seal line has a shape of a letter "I".

18. The liquid crystal display device of claim 16, wherein the main seal lines are formed using a dispenser-print method.

19. The liquid crystal display device of claim 16, wherein the first and second auxiliary seal lines are formed using a dispenser-print method.

* * * * *